US009200662B2

(12) United States Patent
Maloney

(10) Patent No.: US 9,200,662 B2
(45) Date of Patent: Dec. 1, 2015

(54) MINIATURE TACK PINS

(75) Inventor: Michael Maloney, Doylestown, PA (US)

(73) Assignee: PEM Management, Inc., Wilmington, DE (US)

(*) Notice: Subject to any disclaimer, the term of this patent is extended or adjusted under 35 U.S.C. 154(b) by 102 days.

(21) Appl. No.: 13/558,519

(22) Filed: Jul. 26, 2012

(65) Prior Publication Data
US 2013/0034408 A1 Feb. 7, 2013

Related U.S. Application Data

(60) Provisional application No. 61/513,845, filed on Aug. 1, 2011.

(51) Int. Cl.
F16B 15/08 (2006.01)
F16B 27/00 (2006.01)

(52) U.S. Cl.
CPC *F16B 27/00* (2013.01); *F16B 15/08* (2013.01)

(58) Field of Classification Search
CPC .......... F16B 27/00; F16B 15/08; F16B 15/02; F16B 15/06; F16B 37/068
USPC ......... 411/445, 487, 488, 489, 490, 492, 494, 411/497, 499, 508–510, 442, 339, 180, 446, 411/451.1, 451.5, 922, 923
See application file for complete search history.

(56) References Cited

U.S. PATENT DOCUMENTS

| 2,182 | A | * | 7/1841 | Ballard | 411/452 |
| 182,495 | A | * | 9/1876 | Trask | 411/445 |
| 341,413 | A | * | 5/1886 | Fowler | 411/445 |
| 364,779 | A | * | 6/1887 | Seymour | 411/455 |
| 599,933 | A | | 3/1898 | Goddu | |
| 1,200,594 | A | * | 10/1916 | Curtis | 411/455 |
| 1,377,262 | A | | 5/1921 | Mackenzie | |
| 1,617,818 | A | * | 2/1927 | MacKenzie | 411/490 |
| 2,366,510 | A | * | 1/1945 | Frank | 411/445 |
| 3,187,427 | A | | 6/1965 | Double | |
| 3,399,705 | A | | 9/1968 | Breed et al. | |
| 3,571,903 | A | | 3/1971 | Persson | |
| 3,704,507 | A | | 12/1972 | Grube | |
| 3,915,052 | A | | 10/1975 | Ruhl | |
| 3,967,669 | A | * | 7/1976 | Egner | 411/184 |

(Continued)

FOREIGN PATENT DOCUMENTS

| CN | 1129294 | 8/1996 |
| CN | 101970888 | 2/2011 |

*Primary Examiner* — Roberta Delisle
(74) *Attorney, Agent, or Firm* — Ryder, Lu, Mazzeo & Konieczny, LLC; Joseph M. Konieczny, Sr.; Gregory J. Gore

(57) ABSTRACT

A fastener pin has a head at a topmost end that is the greatest diameter of the fastener. A shoulder extends downward from the head and includes a bottom surface for displacing material of a host object. A broaching section of rectangular lateral cross-section is located immediately below the displacer by cutting a rectangular profile into a round installation hole in the host object. Immediately below the broaching section is a tapered tip at a bottommost end which may be in the shape of a rectangular pyramid rotated radially out of alignment with the remainder of the other fastener features which all have parallel side edges. This individual fastener is one of a series of substantially identical pins attached toe-to-head at severable joints in a continuous string of fasteners.

13 Claims, 5 Drawing Sheets

(56) References Cited

U.S. PATENT DOCUMENTS

| | | |
|---|---|---|
| 3,999,659 A | 12/1976 | Grube |
| 4,119,827 A * | 10/1978 | Lenox .............................. 219/98 |
| 4,449,878 A | 5/1984 | Hallock |
| RE34,928 E * | 5/1995 | Highfield ..................... 411/178 |
| 6,997,659 B2 | 2/2006 | Vrana et al. |
| 7,427,180 B2 | 9/2008 | Ladoucer et al. |
| 8,297,899 B2 * | 10/2012 | Maloney ....................... 411/339 |
| 8,366,364 B2 * | 2/2013 | Maloney ....................... 411/179 |
| 8,616,039 B2 * | 12/2013 | Maloney ......................... 72/352 |
| 2011/0097172 A1 | 4/2011 | Maloney |

* cited by examiner

1A

1B

1C

1D

2A

2B

2C

2D

3A

3B

3C

3D

4A

4B

4C

4D

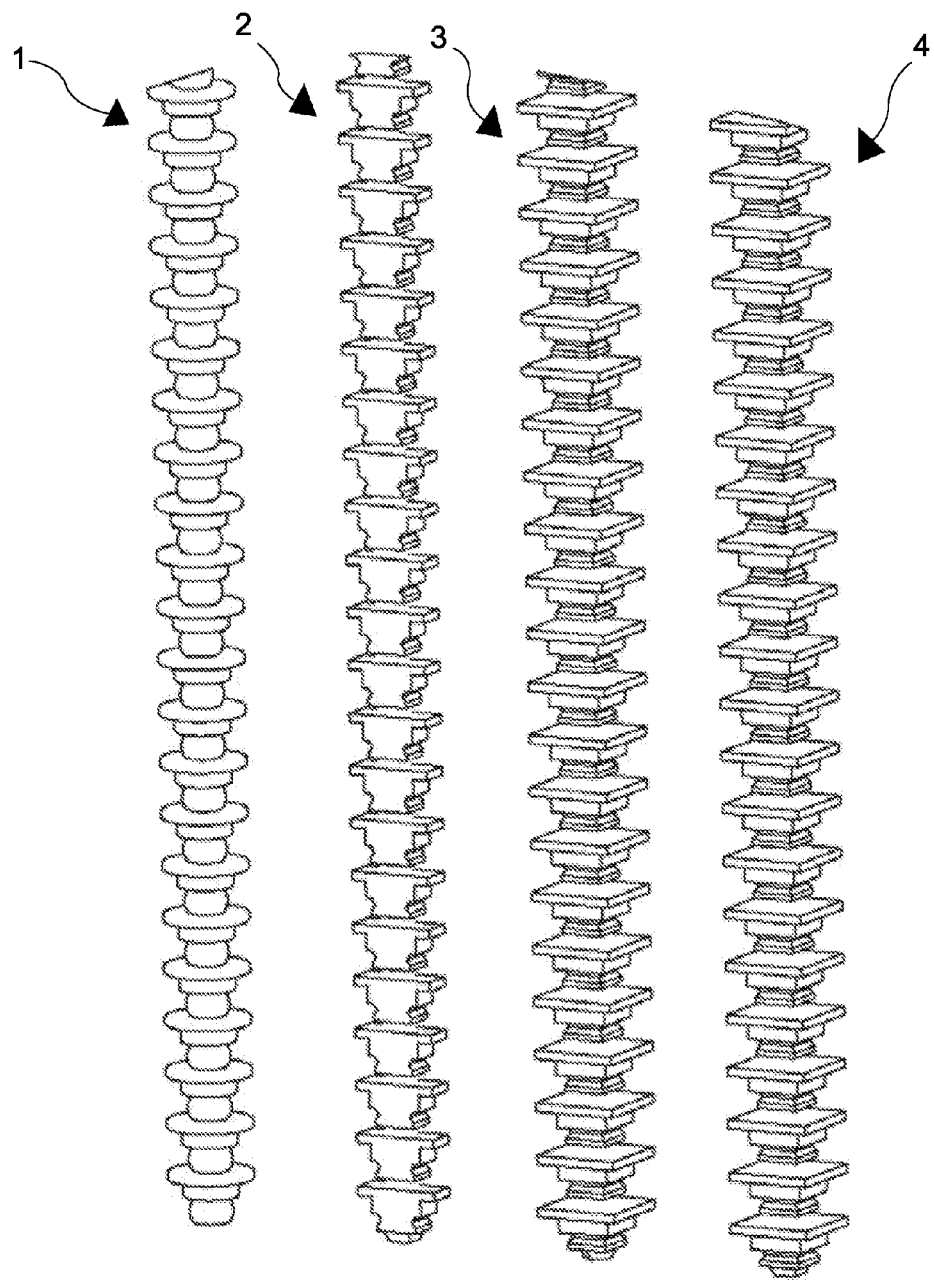

MINIATURE TACK PINS

RELATED APPLICATION

This patent application is a non-provisional of provisional patent application Ser. No. 61/513,845 entitled "Miniature Tack Pins" filed on Aug. 1, 2011, priority from which is hereby claimed.

FIELD OF THE INVENTION

The present invention relates to a miniature fastener applied to two panels with aligned apertures face-to-face severed one at a time prior to installation. More specifically, it relates to a clinching pin which deforms the bottom panel to join the panels by clinch attachment.

BACKGROUND OF THE INVENTION

Clinch-type fasteners are well known in the art for securing panels together face-to-face. A displacer on the shank of the pin deforms material of the bottom panel pushing it into an undercut in the shank thus locking the pin into the bottom panel holding the top panel against it by the head of the pin. A head of the fastener abuts the top sheet and retains it against a bottom panel when the fastener is pressed in.

A problem exists however when handling clinch-type tack pins which are in miniature because they are difficult to handle when one attempts to manually place them into position for a press-in attachment process. As tack pins are being designed and used ever smaller, the automatic orientation feeding installation of these parts becomes more difficult and even impossible to do with some very small parts. Therefore, there is a need in the art for a machine-fed miniature tack pin which can be installed in an automated process resulting in two panels being effectively fastened together.

SUMMARY OF THE INVENTION

The present invention is a clinching pin with a head, a shoulder and an undercut for clinching. This part is used to hold two sheets of metal together, the top sheet being captivated beneath the head of the pin while the body of the pin is clinched into the bottom of the sheet. In one embodiment of the invention, the pin is square or rectangular in cross-section with a broaching portion at the tip which forms a square or rectangular portion in a round hole of the bottom sheet for straight edge clinching features to engage. All features of the pin are formed in one forming or etching operation. In another embodiment, the pins are severably attached toe-to-head in a string and fed on a reel to the attachment site to simplify the feed and installation process.

More specifically, the applicant has invented a fastener pin having a head at a topmost end that is the greatest diameter of the fastener. A shoulder extends downward from the head and includes a bottom surface for displacing material of a host object. A broaching section of rectangular lateral cross-section is located immediately below the displacer by cutting a rectangular profile into a round installation hole in the host object. Immediately below the broaching section is a tapered tip at a bottommost end which may be in the shape of a rectangular pyramid rotated radially out of alignment with the remainder of the other fastener features which all have parallel side edges. The invention further contemplates that this individual fastener is one of a series of substantially identical pins attached toe-to-head at severable joints in a continuous string of fasteners.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention.

BRIEF DESCRIPTION OF THE DRAWINGS

FIG. 1A is a front bottom isometric view; FIGS. 1B and 1C are sequential elevation sectional views showing installation of the invention; and FIG. 1D is a bottom plan sectional view taken from FIG. 1C.

FIG. 2A is a bottom right front isometric view; FIGS. 2B and 2C are sequential elevation sectional views showing installation of the invention; and FIG. 2D is a bottom plan sectional view taken from FIG. 2C.

FIG. 3A is a bottom right front isometric view; FIGS. 3B and 3C are sequential elevation sectional views showing installation of the invention; and FIG. 3D is a bottom plan sectional view taken from FIG. 3C.

FIG. 4A is a bottom right front isometric view; FIGS. 4B and 4C are sequential elevation sectional views showing installation of the invention; and FIG. 4D is a bottom plan sectional view taken from FIG. 4C.

FIG. 5 depicts a top right front isometric views of the embodiments shown in FIGS. 1-4 manufactured as continuous strings of individual fasteners joined toe-to-head.

DESCRIPTION OF THE PREFERRED EMBODIMENT

Figure 1:
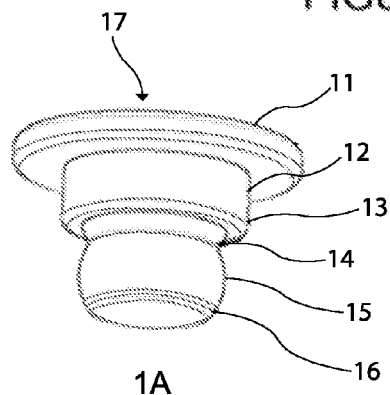
FIG. 1 includes individual drawings A-D.
Figure 1:
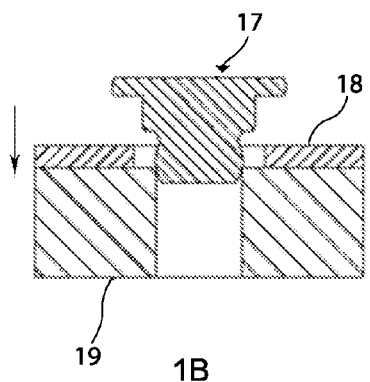
Figure 1:
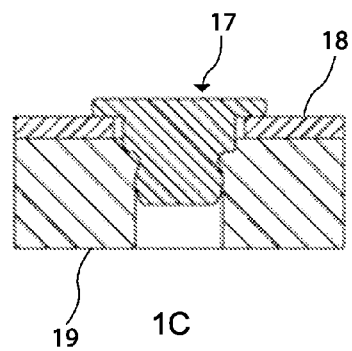
Figure 1:
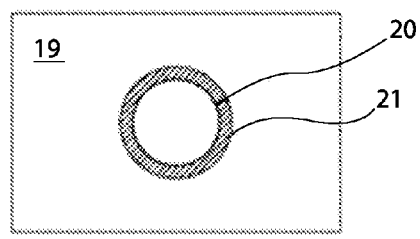

Referring now to FIGS. 1A-1D, a head 11 of pin 17 retains a top sheet 18 onto a bottom panel 19. A shoulder 12 on the body of the pin allows vertical clearance for the top sheet. A portion of the shoulder is a displacer 13 for clinching that forms a lower portion of the shoulder 12. An undercut 14 beneath the shoulder is filled with displaced material of the bottom panel 19 during the pressed-in application which then retains the fastener to the bottom panel. During the installation process, an interference bulb 15 perfectly sizes the installation hole for receiving the displacer diameter that follows the bulb 15 into the installation hole. A tapered tip 16 aids in the alignment of the tack pin as it enters the installation hole. Referring to the various views of a round tack pin which embodies the invention, FIGS. 1B and 1C illustrate that the interference bulb effectively centers the part and sizes the installation hole so that all of the displaced material is available to fill the undercut of the fastener thereby eliminating the inefficiency of filling clearance space around the fastener as is necessary for clinch fasteners that do not have an interference hole sizing feature such as the present interference bulb. FIG. 1D depicts the interference sizing ring band projected area 20 and the projected displaced material area 21 in sheet 19.

Figure 2:
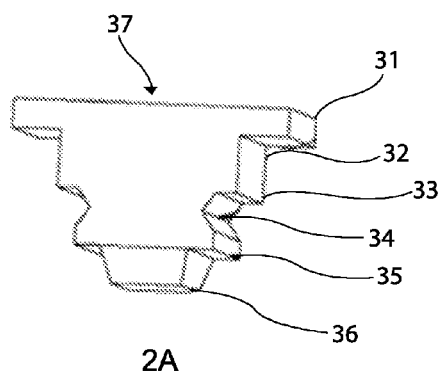
FIG. 2 includes individual drawings A-D.
Figure 2:
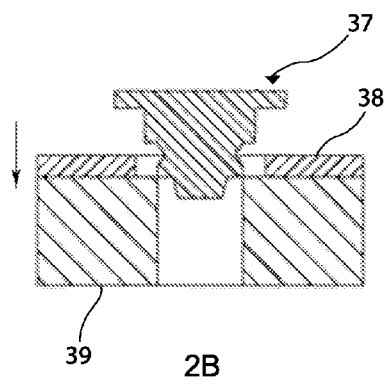
Figure 2:
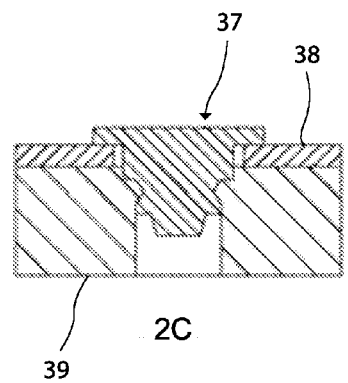
Figure 2:
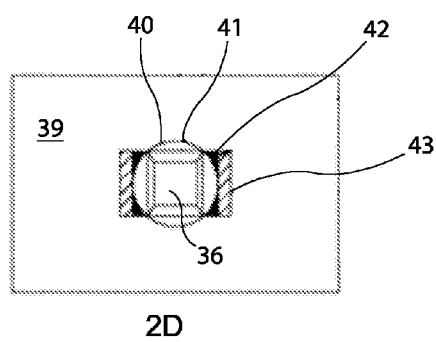
Figure 3:
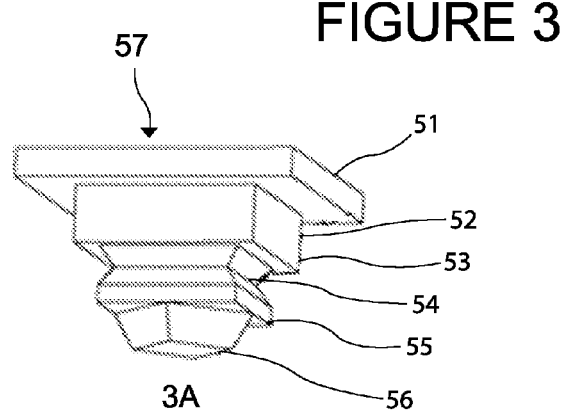
FIG. 3 includes individual drawings A-D.
Figure 3:
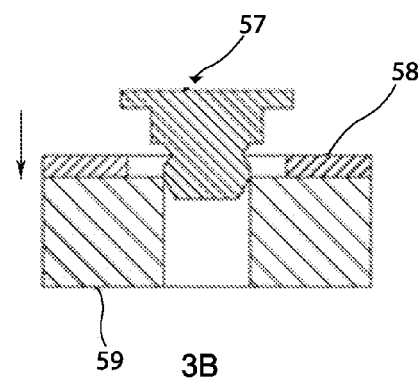
Figure 3:
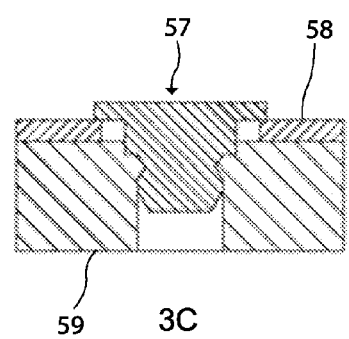
Figure 3:
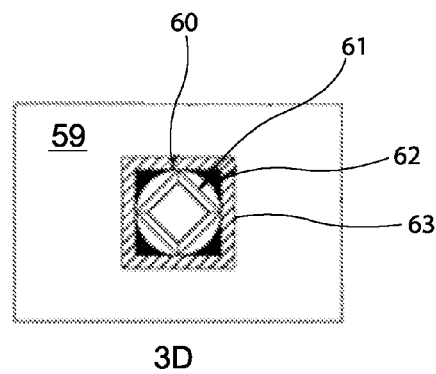
Figure 4:
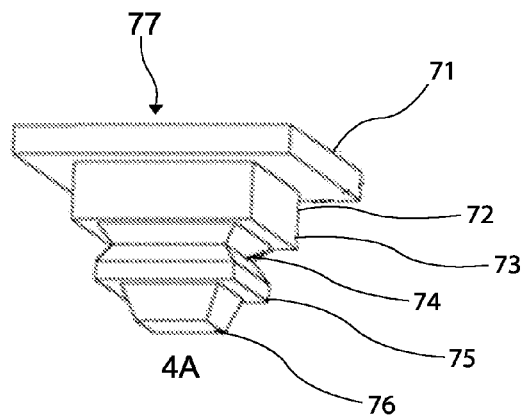
FIG. 4 includes individual drawings A-D.
Figure 4:
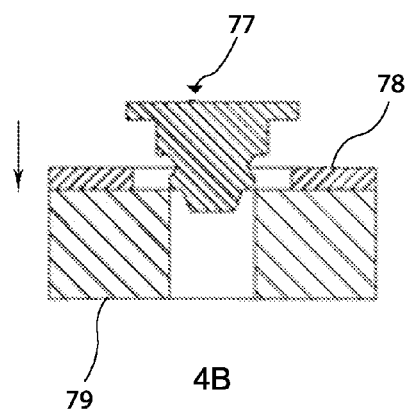
Figure 4:
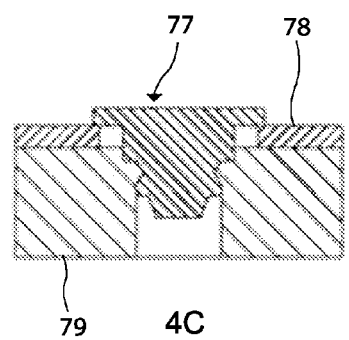
Figure 4:
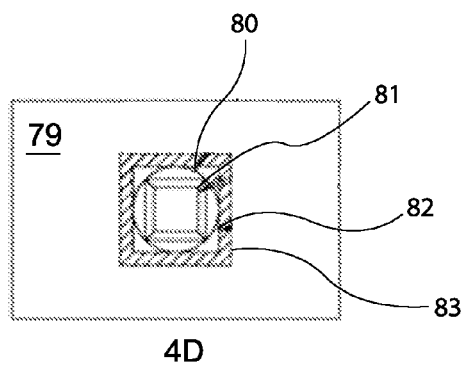

FIGS. 2 through 4 illustrate other geometries for tack pins of the present invention. The functionality of the respective features of a head, an undercut, a displacer and a tapered tip are well-known to those of skill in the art and need not be individually described in each of the separate embodiments shown in FIGS. 2-4. With all other features of the tack pin including the undercut and the displacer sections being equal, the length of the clinch area is proportional to the fastener's pullout performance such that the longer the clinch, the stronger the pullout strength which, assuming that the head of the fastener is significantly stronger than the clinch attachment, is exemplified by the resistance to shearing the metal in the undercut. The longer the filled undercut is the stronger the pullout is.

Referring now to FIG. 2, another embodiment of the invention includes a rectangular tack pin that will clinch in on two edges. This version of the tack pin includes head 31, shoulder 32, displacer 33, undercut 34, and a tapered tip 36 in a rectangular pyramid shape instead of the smooth-sided conical shape provided by the previous embodiment shown in FIG. 1. In all of the embodiments, the tapered tip centers the part in the round hole, in this case by having four corners at the base of the pyramidal tip finishing on tangent points with the installation hole as shown in FIG. 2D. Once this part is centered in the hole, a rectangular broaching section 35 follows as the pressing installation continues. This structure replaces the interference bulb described in the previous embodiment of FIG. 1 which illustrates a round tack pin with a circular lateral cross-section at all points. As the pin 37 is installed the rectangular broaching section 35 effectively changes the shape of the top of the round hole in the bottom panel to prepare it for clinching with the rectangular displacer that follows as shown in FIG. 2C. FIG. 2D shows the relationship between the installation hole 40, the tapered tip 36, the projected area 42 of the broaching sizing and the rectangular displaced section projected area 43. Excess metal from the broaching process enters the void of the installation hole below the fastener. Greater efficiency is provided by the broaching section since there is no clearance volume around the fastener that has to be filled before clinching occurs. Because of the geometric necessities of this rectangular geometry, the fact that only two edges are being clinched in, a performance lower than that of the previously described round tack pin can be expected.

Referring to FIGS. 3 and 4, two additional configurations of the tack pin are disclosed which show a square cross-section of features. The pins in these embodiments clinch on all four sides. The difference in the two configurations is only in the orientation of the lead-in tip. FIG. 3A depicts the pin features of a head 51, a shoulder 52, a displacer 53, an undercut 54, a broach 55, and a tapered tip 56. As shown in FIGS. 3B and 3C the installation process clinches pin 57 into panel 59 by forceable pressing, thus retaining sheet 58. The configuration shown in FIG. 3 has a rotated tip that aligns material that is being broached to make the installation hole into a square with flat sides of the tapered tip allowing more unrestricted space for the waste material to enter. FIG. 3D depicts the installation hole 60 of panel 59, the tapered tip of the fastener 61, the square broaching section projected area 62, and the square displacer section projected area 63.

The configuration shown in FIG. 4 which has the tip aligned in parallel with the side edges of all other square section features on the fastener. Features 71-76 of this embodiment correspond to Features 51-56, respectively, described with regard to FIG. 3 above. The difference is that tapered tip 76 is not rotated radially out of alignment but is parallel with the remainder of the other parallel feature side edges. The installation sequence shown in FIGS. 4B and 4C is identical to the previous embodiments wherein fastener 77 secures sheet 78 to panel 79 by forceable deformation of the panel 79. FIG. 4D depicts the installation hole 80, the lead-in tapered tip 81 and the projected areas of the square broaching section 82 and the square displacer section 83.

The tack pins in FIGS. 3 and 4 have a square-based pyramidal lead-in tip that centers the part in a round installation hole as the fastener enters. A square broaching section then follows creating a square opening at the top of the round installation hole. The broaching section is followed by a four-sided undercut and displacer. This configuration creates the longest clinch length of all of the embodiments disclosed herein. For example, the clinch length of the square tack pin shown in FIGS. 2 and 3 is 1.6 times greater than the clinch length of the round fastener shown in FIG. 1.

Referring now to FIG. 5, all four configurations of the tack pin shown in FIGS. 1-4 are illustrated in strips 1-4 each attached toe-to-head. Continuous manufacturing methods are required to make the tack pins in these continuous string configurations. For example, the round continuous feed tack pins are made on a continuous wire feed CNC machine with the cutters or roll formers orbit the axis of straightened wire as it feeds through the CNC lathe. The rectangular continuous feed tack pins are made either by continuous stamping or reel-to-reel photo etching machinery. The square pins require reel-to-reel photo etching and laser cutting oriented at 90° to the photo etching to cut the profile on the front and back sides of the photo etched parts. These parts are designed to shear off each part from the end of the string for installation. The shear force required is controlled by the contact area between the tip of the head and the tip and the head of the next adjacent tack pin. The tack pins are then packaged on a standard reel and then loaded into a module that both shears a part from the string and delivers each part to a punch for installation.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An elongated strip of fastener pins connected toe-to-head at severable joints between them, comprising:
   a series of severably attached miniature fastener pins, each individual fastener adapted for forcible insertion into a host material, and comprising,
   a head of greatest lateral dimension of the fastener at a topmost end adapted for securing a top sheet to the host material adjacent a first severable joint;
   a shoulder adjacent said head including a displacer portion at the bottom for displacing host material;
   an undercut immediately adjacent said shoulder for receiving the host material displaced by said shoulder to affix said fastener to the host material;
   a shank adapted for engagement with said host material; and
   a tapered tip at a bottommost toe end adjacent a second severable joint.

2. The strip of fasteners of claim 1 further including a barrel-shaped bulb of circular lateral cross-section and continuous arcuate longitudinal cross-section extending from said undercut and to the toe of said tapered tip, said bulb adapted for radially expanding a round receiving hole in the host material only by material displacement without cutting so that all of the displaced host material is available to fill the undercut.

3. The strip of fasteners of claim 1 wherein the lateral cross-section of said fasteners is rectangular at all points along their entire length.

4. The strip of fasteners of claim 3 further including a broaching section located between the undercut and the tapered tip for shaping the sides top of a cylindrical receiving hole in the host material of lesser diameter then a diagonal length of the broaching section.

5. The strip of fasteners of claim 1 wherein said tapered tip is defined by a rectangular pyramid shape.

6. The strip of fasteners of claim 5 wherein the lateral cross-section of said fasteners is square at all points along their entire length.

7. The strip of fasteners of claim 6 wherein the tapered tip is radially offset 45 degrees with respect to said shoulder.

8. A fastener pin, comprising:
a head at a topmost end, said head being defining the greatest lateral dimension of the fastener pin;
a shoulder of rectangular lateral cross-section extending downward from said head, said shoulder including a bottom surface for displacing material of a host object;
an undercut located below the shoulder for receiving displaced material of said host object;
a broaching section of rectangular lateral cross-section located immediately below said undercut for cutting a rectangular profile into a round installation hole in the host object; and
a tapered tip terminating at a bottommost toe end of the fastener pin, said tip having a rectangular lateral cross-section along its entire length.

9. The fastener pin of claim 8 wherein the lateral cross-section of the fastener pin is rectangular at all points along its entire length.

10. The fastener pin of claim 9 wherein said tapered tip is a truncated rectangular pyramid.

11. The fastener of claim 10 further described in that said tapered tip is defined by a square pyramid which is rotated radially out of alignment with the broaching section.

12. The fastener pin of claim 11 where said fastener pin is one of a series of substantially identical pins attached at severable joints in a continuous string of fasteners.

13. The fastener pin of claim 12 where said series of substantially identical said pins are attached toe-to-head at the severable joints.

* * * * *